United States Patent [19]

Chang

[11] Patent Number: 4,933,870
[45] Date of Patent: Jun. 12, 1990

[54] DIGITAL SILVER ION CONCENTRATION CONTROLLER FOR THE PRECIPITATION OF SILVER HALIDE EMULSIONS

[75] Inventor: Yun C. Chang, Rochester, N.Y.

[73] Assignee: Eastman Kodak Company, Rochester, N.Y.

[21] Appl. No.: 218,772

[22] Filed: Jul. 14, 1988

[51] Int. Cl.$^5$ .............................................. G06G 7/57
[52] U.S. Cl. .................................... 364/497; 364/500; 204/406
[58] Field of Search ............... 364/497, 500, 857, 861; 204/1 T, 1 R, 400, 405, 406; 422/68, 82; 430/400, 30; 324/446, 432

[56] References Cited

U.S. PATENT DOCUMENTS

| | | | |
|---|---|---|---|
| 3,624,638 | 12/1971 | Riseman | 364/857 |
| 3,730,685 | 5/1973 | Prohaska | 204/405 |
| 3,999,048 | 12/1976 | Parthemore | 364/500 |
| 4,045,721 | 8/1977 | Swain | 324/432 |
| 4,055,478 | 10/1977 | Wilson | 204/405 |
| 4,065,313 | 12/1977 | Shippey | 430/30 |
| 4,071,427 | 1/1978 | Cheng et al. | 204/1 T |
| 4,157,283 | 6/1979 | Zetter | 324/446 |
| 4,499,552 | 2/1985 | Kanazawa | 364/802 |
| 4,838,999 | 6/1989 | Haar et al. | 204/1 T |

Primary Examiner—Kevin J. Teska
Assistant Examiner—Ellis B. Ramirez
Attorney, Agent, or Firm—Edward Dugas

[57] ABSTRACT

Apparatus for controlling the concentration of silver ions during the precipitating of a silver halide emulsion in a precipitation vessel. The introduction of a silver salt and a halide salt is controlled in accordance with a preselected program, which in turn is responsive to the silver ion concentration measured in the vessel by a silver ion sensor. Linerization of the output signal from the sensor is accomplished by converting the sensor's output voltage into a concentration voltage through the use of a Nernst equation and by transforming the concentration voltage into a variable value denoted Y representing a constant coefficient differential equation that is linear. The linear equation is then used to control the addition of the silver salt and the halide salt to the precipitation vessel.

4 Claims, 4 Drawing Sheets

DIGITAL SILVER ION CONCENTRATION CONTROLLER FOR THE PRECIPITATION OF SILVER HALIDE EMULSIONS

TECHNICAL FIELD OF THE INVENTION

The present invention relates to an apparatus and a method for controlling the silver ion concentration in the precipitation of a silver halide emulsion. More particularly, the invention is directed to a linearization of the signal from a silver ion sensor.

BACKGROUND OF THE INVENTION

A portion of the disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

In systems which make photographic emulsions utilizing silver ion concentrations, an ion sensor senses the concentration of ion in the mixture and provides a signal which is a function of the concentration. A desired concentration for the mixture is generally represented as a set point signal which is compared against the concentration signal from the ion sensor to provide a difference signal. This difference signal is used to control the flow rate of silver salt and halide salt solutions flowing into a precipitation vessel. It is well-known that the signal from the ion sensor is non-linear, which translates into having to provide large amounts of silver nitrate to the emulsion to cause relatively small voltage changes in the sensor's output when the sensor is operating in one range of its output versus having to add slight amounts of additional silver nitrate to cause the same magnitude of voltage change in the sensor's output when the sensor is operating in another range of its output.

A prior art patent of interest for its teachings in this art area is U.S. Pat. No. 3,999,048 entitled "Flow Control System for the Precipitation of Silver Halide Emulsions" by K. G. Parthemore. The invention of that patent directs its focus on solving the problem of a non-linear sensor output being due to the non-linear characteristics of the measured variable (silver ion concentration) in the precipitating process which results in unwanted over or under conditions in the control of the valves that interrupt the flow of the silver salt and halide salt into the precipitation vessel. The invention appreciates the non-linearity of the sensor's output and through an anti-log circuit provides a degree of linearity to that signal to provide an improved mixing system.

It is believed, that because of the resolution limits of the silver ion measurement sensor that the concentration measurement in the form of a voltage can only be accurate within a limited range. Therefore, feedback control based on a concentration voltage results in a degree of over and/or under control in the actual precipitation.

Improvements in the field of ion concentration controllers, therefore, are possible by improving the linearization of the ion sensor's output signal. The present invention is directed towards such an improvement.

SUMMARY OF THE INVENTION

The apparatus of the present invention controls the concentration of silver ions during the precipitation of a silver halide emulsion in a precipitation vessel. The apparatus is comprised of a first means for controlling the introduction of a silver salt into the precipitation vessel and a second means for controlling the introduction of a halide salt into the same vessel. An ion sensor is positioned in the precipitation vessel for generating a signal representative of the silver ion concentration therein. A set point signal generator provides a signal indicative of the desired ion concentration for the emulsion. A converter converts the signal from the ion sensor to a concentration signal that represents the concentration of the silver ions in the emulsion utilizing a Nernst equation in accordance with the following:

$$V_{Ag} = V^o_{Ag} + \frac{RT}{F} \ln[Ag+]$$

where:
R = gas constant
T = absolute temperature in Kelvin
F = Faraday constant.

From the concentration signal, a non-linear differential equation is formed using a software program operating in an associative computer. The non-linear differential equation is expanded using a Taylor expansion for two of the variables and the higher order terms of the expansion are minimized. The resultant constant coefficient differential equation is transformed to digital control signals that are used to control the first and the second means for introducing the silver salt and the halide salt, respectively, into the precipitation vessel.

Processing the ion sensor signal to represent a concentration and to then transform the concentration signal to a linear control signal thus provides an improved system.

Accordingly, it is a primary object of the present invention to provide an apparatus and a method for converting and transforming a non-linear ion sensor output signal to a linear signal.

It is another object of the present invention to provide a system and a method for linearly controlling the flow of materials to a mixing vessel.

These and other objects of the present invention will become more apparent when taken in conjunction with the following description and drawings wherein like characters indicate like parts and which drawings form a part of the present specification.

DESCRIPTION OF THE PREFERRED EMBODIMENT

Figure 1:
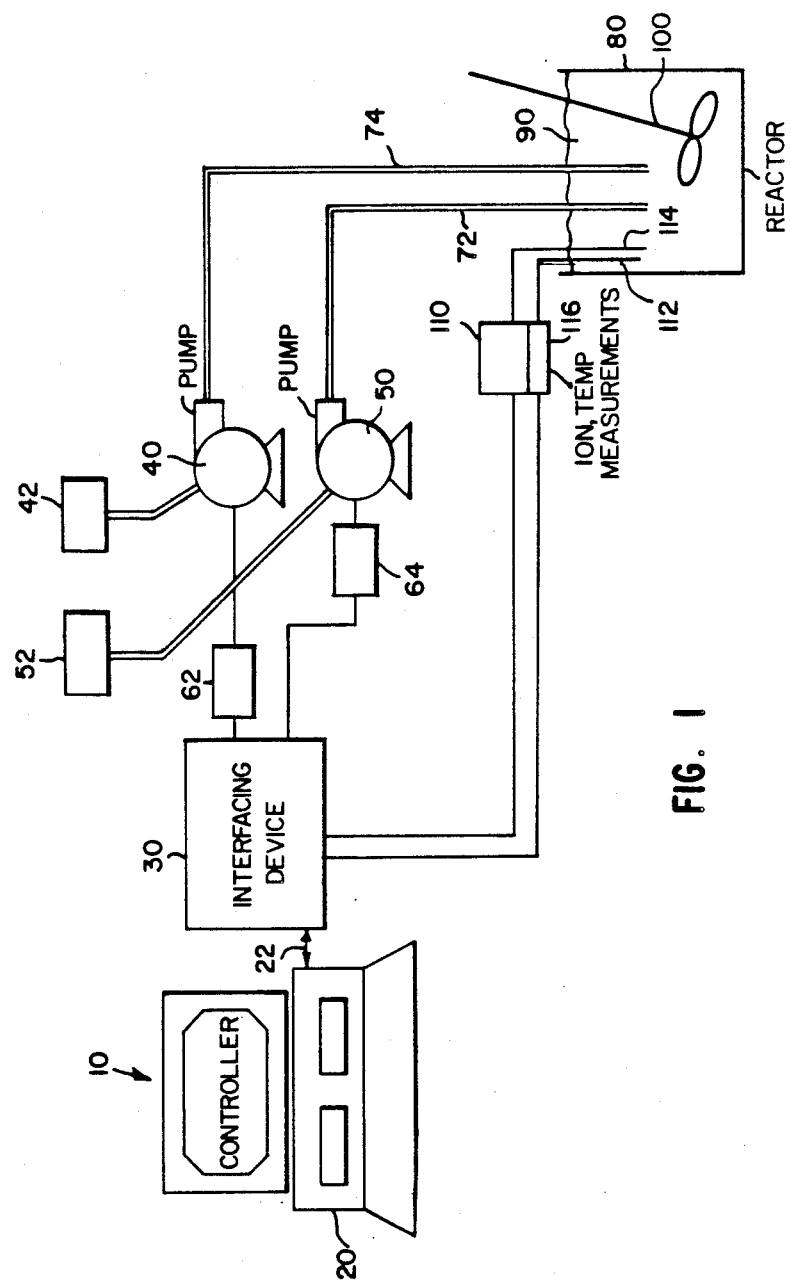
FIG. 1 is a partially schematic representation of a system for controlling the concentration of silver ions in the precipitation of a silver salt solution and a halide salt solution.

Referring to FIG. 1, wherein a computer-controlled system 10 for controlling the silver ion concentration in a precipitation of silver halide emulsion is shown. A precipitation vessel 80 holds the emulsion mix 90 which is agitated by mixer 100. An aqueous halide salt solution from a storage vessel 52 is pumped into the precipitation vessel 80 through piping 72 by means of a pump 50. The pump 50 responds to a power signal from a pump driver circuit 64. In a like manner, a silver nitrate solution is pumped into the vessel 80 through piping 74 from a reservoir 42 by means of a pump 40. The pump 40 is driven by a power signal from a pump driver circuit 62.

Submerged in the mixture 90, within the tank 80, is a temperature probe 112 and an ion sensor 114. In the preferred embodiment of the invention, the temperature probe 112 is a Hycal Engineering, RTS series probe. The ion sensor 114 may be composed of a silver ion concentration measuring electrode (Orion Model 94-35A), and a silver-silver chloride reference electrode. The temperature probe 112 is coupled to an interfacing device 30 by means of a temperature transmitter 116. The temperature transmitter is of the type manufactured by Hycal Engineering, bearing their Model No. CT-801A. The ion sensing probe 114 is coupled to the interfacing device 30 by means of a buffer circuit 110 which circuit functions to amplify the voltage signal from the ion sensor to a level corresponding to the input response range of the interfacing device 30. The interfacing device 30 functions to transform the analog voltages received from the buffer 110 and the temperature transmitter 116 into corresponding digital signals. The converted analog signals are then provided to a computer 20 via a bidirectional data bus 22. The computer 20 operates on the provided signals to generate the control signals that are transmitted through the interfacing device 30 to the pump drivers 62 and 64. The control signals are used to start and to stop the pumps 40 and 50. In the preferred embodiment of the invention, the interfacing device 30 is an I/O board supplied by Burr-Brown under their Model No. PCI-20001 for the carrier, Model No. PCI-20002M for the A/D converter, and PCI-200021M for the D/A converter. The computer 20 is an IBM PC and the software, attached as Appendix A, is designed to run on the IBM PC.

Figure 2:
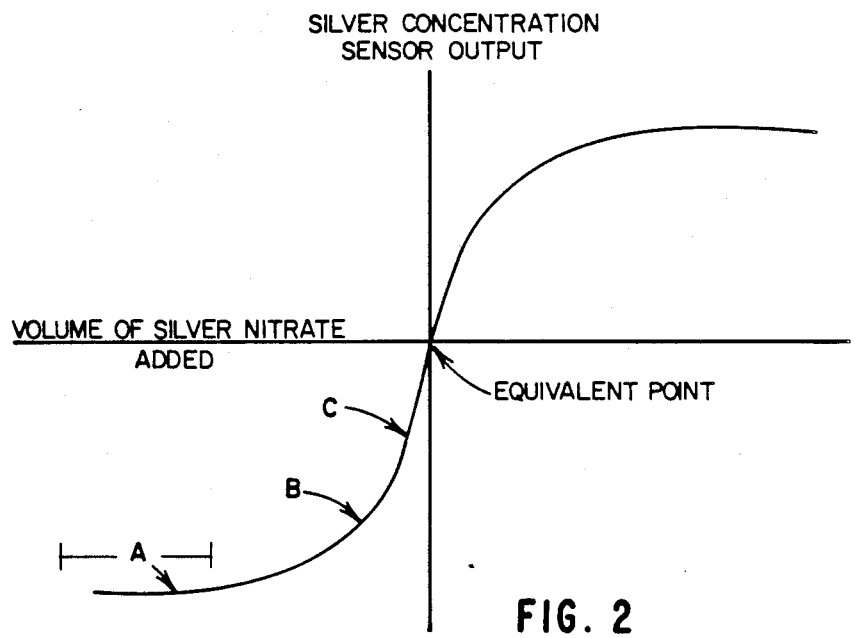
FIG. 2 is a curve representing the response of a silver ion concentration sensor when a silver salt solution is added to a halide salt solution.

FIG. 2 illustrates a titration curve which shows the output signal from an ion sensor that is immersed in a halide salt solution as a constant molarity silver salt solution is added. The abscissa axis defines the amount of silver salt solution added to the solution by volume. The ordinate axis corresponds to the output voltage signal of the ion sensor. To control the silver ion concentration, a set point that represents the desired silver concentration is chosen and represented in a voltage format. The silver ion sensor sends back the voltage measured in the precipitation vessel to be compared against the set point voltage. The difference in voltages between the sensor and the set point is then used as an error signal to drive the controller and, in turn, the respective pumps. Due to the non-linearity of the output voltage from the sensor, it is often necessary to adjust the controller dependent on the location of the set point. For example, at point A in FIG. 2, a large amount of silver nitrate has to be added to cause a voltage change in the sensor, as the curve is relatively flat in this particular area. On the contrary, at point C, it requires only a slight amount of silver nitrate to be added to show the same amount of change in the sensor's voltage. Point B results in a response that falls between the range extremes of points A and C.

Figure 3:
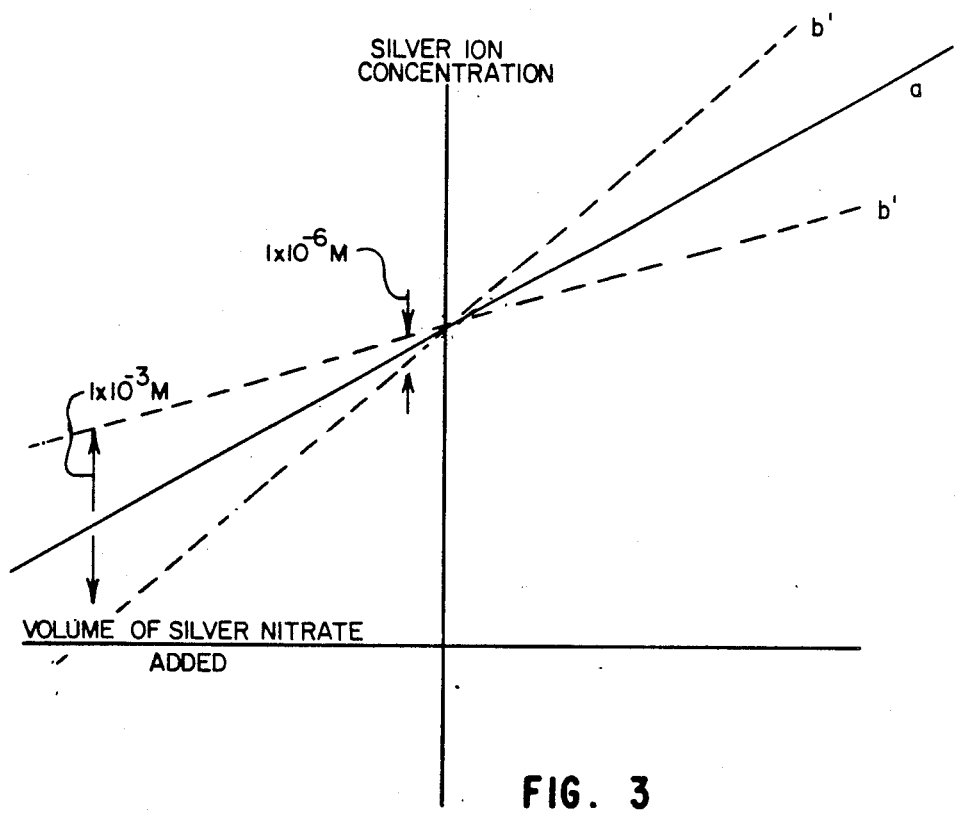
FIG. 3 is a group of curves illustrating the linearized ideal output of a ion sensor as compared with two curves of a real-life sensor.

Referring now to FIG. 3, prior art systems and methods which linearize the sensor's output voltages reference the curve line designated "a" in FIG. 3 as being the ideal solution, i.e., the measured voltage reflects the concentration variation in the range of $1 \times 10^{-3}$M. In reality, the concentration conversion, based on actual measured voltage, can be anywhere between the two dotted lines denoted b' because of the resolution limits of the silver ion measurement sensor. Feedback control based on concentration measurements, therefore, result in over or under control in the actual precipitation mix.

The pesent invention involves converting the voltage from the ion sensor into a concentration equivalent voltage and further involves transforming that concentration voltage into a new linear voltage Y which enhances the resolution of the data from the ion sensor while providing a linear voltage that can be used to control the pumps. As a result of this conversion and transformation, a proportional-integral controller, without any additional tuning, is able to control the silver concentration in the precipitation mix of the type that is used in most silver halide precipitations.

The silver ion sensor voltage is first converted into a silver ion concentration signal, X, through the use of the Nernst equation. Secondly, because of the problems described previously, a transformation is employed on the concentration signal X to arrive at a signal y defined by Equation (1).

$$y = X^{1/n} \tag{1}$$

The order of the exponent, n, in the preferred embodiment, was selected to be 2.

It can be deduced that in a quasi steady state condition, where V is the volume of the precipitation vessel, d is the disturbance of the system and u is the control effort, V can be considered constant. Therefore, X can be replaced by y in Equation (1), to yield a non-linear differential equation in y.

$$Vny^{n-1}dY/dt = d + u \tag{2}$$

Equation (2) is then expanded around the steady state using Taylor's expansion for two variables.

$$Vn\, dy/dt = \frac{d_{s.s}}{y_{s.s}^{n-1}} + \frac{(d - d_{s.s})}{y_{s.s}^{n-1}} + \frac{(1-n)d_{s.s}}{y_{s.s}^n}(y - y_{s.s}) + \tag{3}$$

$$\frac{d_{s.s}(n-1)n}{y_{s.s}^{n+1}}(y - y_{s.s})^2 +$$

$$\frac{2(1-n)}{y_{s.s}^n}(d - d_{s.s})(y - y_{s.s}) + O(3) +$$

$$\frac{u_{s.s}}{y_{s.s}^{n-1}} + \frac{(u - u_{s.s})}{y_{s.s}^{n-1}} + \frac{(1-n)u_{s.s}}{y_{s.s}^n}(y - y_{s.s}) +$$

$$\frac{u_{s.s}(n-1)(n)}{y_{s.s}^{n+1}}(y - y_{s.s})^2 +$$

$$\frac{2(1-n)}{y_{s.s}^n}(u - u_{s.s})(y - y_{s.s}) + O(3)$$

where O(3) represents the terms of 3rd order or higher, and s.s represents the steady state value.

To make Equation (3) as linear as possible, the second and higher order terms must be as small as possible. The choice of n equal to 2 minimizes the contributions of the higher order terms and yields:

$$dY/dt + aY \approx bD + bU \quad (4)$$

where a and b are constants, and Y, U and D are deviational values from the steady state.

Equation (4) is now a constant coefficient differential equation (linear). In Laplace transformation form, Equation (4) becomes:

$$Y(s) \approx bD(s)/s+a + bU(s)/s+a \quad (5)$$

Figure 4:
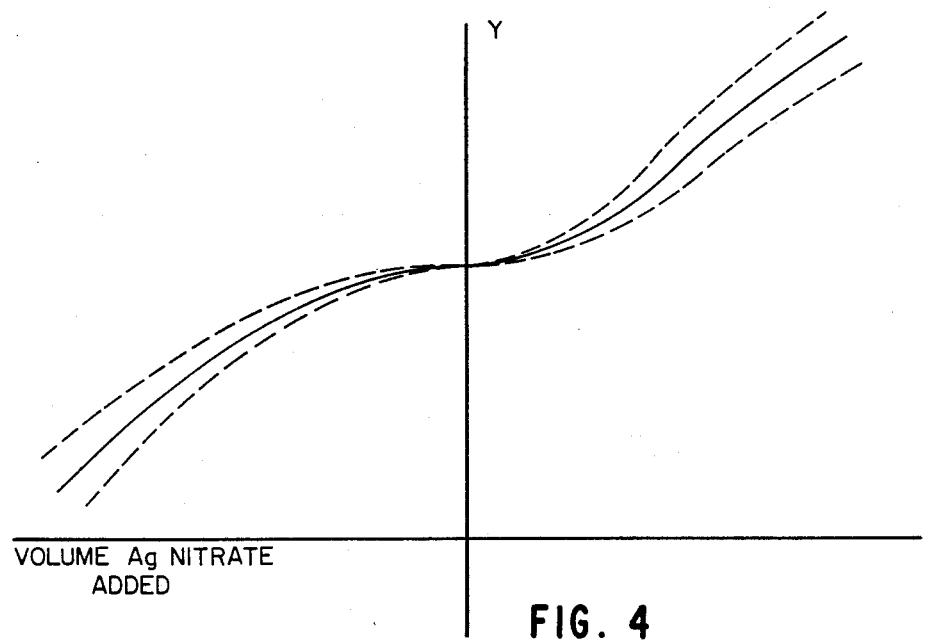
FIG. 4 illustrates the output signal Y of the present invention.

FIG. 4 illustrates the effect of the Y transformation. The Y transformation improves the resolution by narrowing the range between the dotted lines b' and preserves somewhat the linearity. This improvement in the narrowing of the variance range from the desired range permits the use of a proportional controller without any additional requirements of tuning when the set point voltages are varied to different positions. For example, positions A, B and C appearing at various locations on the curve of FIG. 2.

Figure 5:
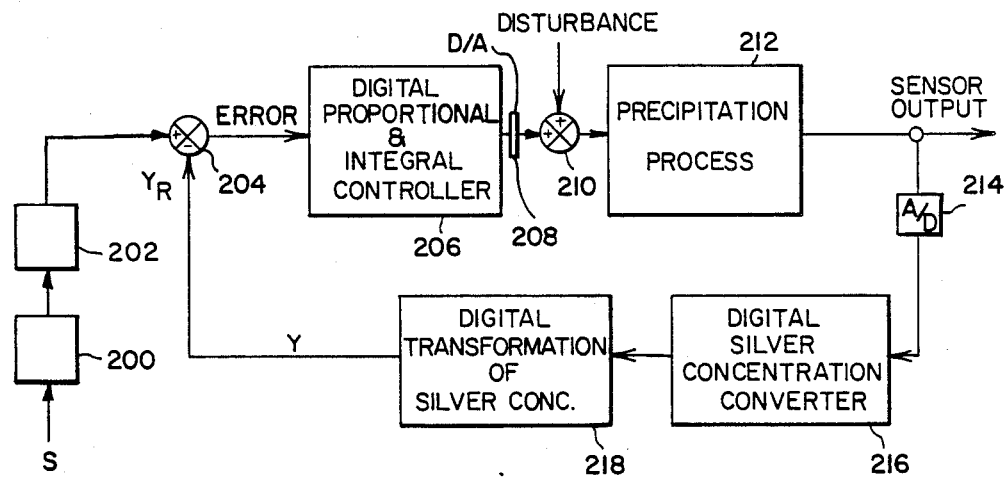
FIG. 5 is a schematic block diagram of the linearizing apparatus of the present invention.

Referring to FIG. 5, the system shown in FIG. 1 is modeled in block diagram form corresponding to a closed loop system under control of the computer software for purposes of facilitating an understanding of the operation of the system for various conditions. A digital voltage value S equal to the set point, is provided to the input of a converter 200 which converter transforms the set value S into a concentration signal $V_{Ag}$ using the Nernst equation which is equal to:
wherein the value R is a gas constant, the value T is the absolute temperature in kelvin of the solution and F is a Faraday constant. The temperature value T is taken from the output of the temperature transmitter 116 shown in FIG. 1. The concentration signal $V_{Ag}$ is then directed to a digital transformation program 202 which utilizes Equation (1) and a value of n equal to 2 to provide a transformed signal $Y_R$ to the positive input of a difference node 204. The negative input of node 204 is connected to receive a digital value signal Y. The Y signal corresponds to the transformed concentration signal for the concentration of the measured solution in the precipitation vessel. The difference between the signals on the inputs to the difference node 204 constitutes an error signal. This error signal is directed to the input of the digital proportional and integral controller 206 which corresponds in part to the computer running under the control of the software attached to the specification as Appendix A. The controller 206, upon receipt of the error signal, computes the value to be assigned to a control signal for driving the respective pumps to correct the concentration of the mixture within the precipitation vessel which in turn will cause the error signal to drive to a minimum value. The output from controller 206 is a digital signal which is transformed to an analog control signal by means of the D/A converter 208.

For modeling purposes, a summing node 210 is inserted into the signal path between the D/A converter 208 and the precipitation process block 212 in order to reflect the realities of an operating system, in that disturbances appear at the mixing site in turn influence the output from the ion sensor. The precipitation process block 212 represents the pumping of the materials into the precipitation tank and the mixing thereof along with the sensing of the ion concentration and the temperature of the mixture. The output signal from the ion sensor and the temperature sensor are directed to an A/D converter 214 and are converted into digital signals. Both digital signals are applied to the input of the concentration converter block 216. The function of block 216 is accomplished within the computer by solving the Nernst equation for $V_{Ag}$ as previously discussed. The output signal from the converter block 216 is the digital calculated value of the concentration which is directed to the digital transformation block 218 wherein the value of Y is computer based upon n being made equal to 2. The computer performs its functions at a scan rate of 1 per second.

Figure 6:
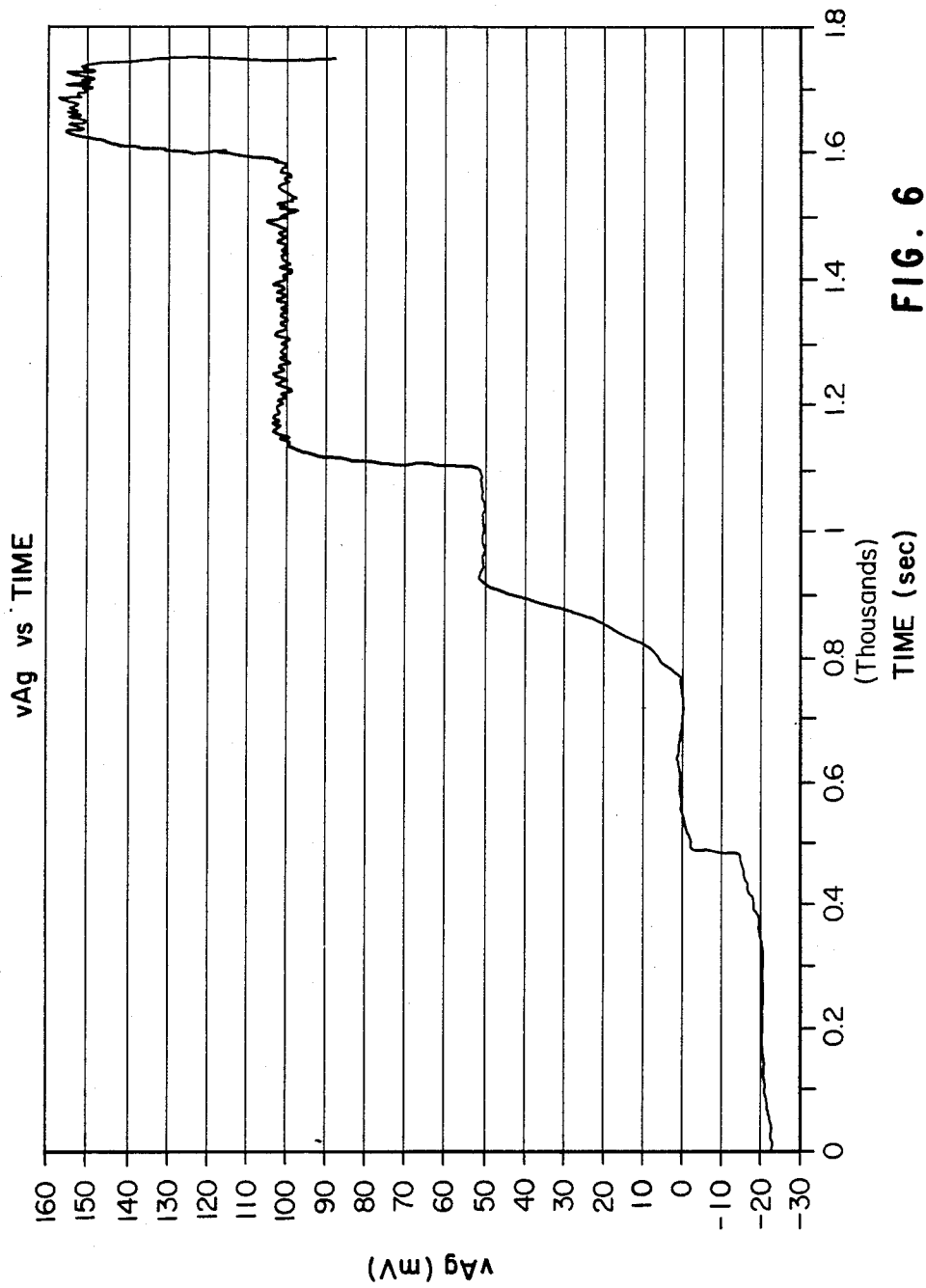
FIG. 6 is a graph illustrating the results achieved with the system and the method of the present invention.

Referring to FIG. 6, wherein the chart of $V_{Ag}$ versus time reflects the tested output of the preferred system and method of the present invention to illustrate the improved performance over the full range of the ion sensor output.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. Apparatus for controlling the concentration of silver ions during the precipitation of a silver halide in a precipitation vessel comprising:
    a first means for controllably introducing a silver salt into said precipitation vessel;
    a second means for controllably introducing a halide salt into said precipitation vessel;
    an ion sensor positioned in said precipitation vessel for generating a voltage representative of the amount of silver ion in solution therein;
    a temperature sensor positioned in said precipitation vessel for generating a voltage representative of the temperature of the silver ion solution therein;
    means for converting the ion sensor voltage and the temperature sensor voltage to digital values;
    computer means for receiving the digital values of the ion sensor and the temperature sensor for converting the digital value of the ion sensor to a digitized concentration value by computing the equation:
    wherein:
    R is a gas constant
    T is the absolute temperature of the solution in degrees Kelvin
    F is the Faraday constant
    and by transforming the digitized concentration value to an equivalent constant coefficient differential equation:

$$dY/dt + aY = bD + bU$$

where: $Y = [Ag+]^{1/n}$
    and where:
    n = 2
    D is the disturbance of the system
    U is the control effort
    b is a constant, and
    a is a constant;

means for comparing the transformed digitized concentrated value against a digitized set point value to provide a difference signal; and means for controlling said first and said second means as a function of said difference signal so as to drive said difference signal towards a zero value.

2. Method for controlling the concentration of silver ions during the precipitation of a silver halide in a precipitation vessel comprising the steps of:

(a) measuring the amount of silver ion in the precipitation vessel with an ion sensor to provide a measured value;

(b) converting the measured value to a concentration value;

(c) transforming the concentration value to an equivalent constant coefficient differential equation; and (d) controlling the amount of silver ions added to the precipitation vessel as a function of the constant coefficient differential equation.

3. The method according to claim 2 and further comprising the step of:

determining the temperature of the solution in the precipitation vessel; and in step (b) converting the measured value to a concentration value following the equation:

wherein:
R is a gas constant
T is the absolute temperature of the solution in degrees Kelvin
F is the Faraday constant.

4. The method according to claim 2 wherein step (c) transforms the concentration value $V_{Ag}$ by employing:

$$Y = [Ag+]^{1/n}$$

wherein n is given a value of 2.

* * * * *

UNITED STATES PATENT AND TRADEMARK OFFICE
CERTIFICATE OF CORRECTION

PATENT NO : 4,933,870

DATED : June 12, 1990

INVENTOR(S) : Yun C. Chang

It is certified that error appears in the above-identified patent and that said Letters Patent is hereby corrected as shown below:

Column 4, line 16, delete "pesent" and insert "present".
Column 4, line 45, "Y" should read --y--

Column 5, line 35, the "equation is missing".
Column 5, line 37, capitalize "kelvin"
Column 6, line 15, delete "computer" and insert "computed".
Column 6, line 51, the "equation is missing", should read -- $V_{Ag} \simeq V°_{Ag} + \frac{RT}{F} \ln [Ag+]$ --
Column 8, line 9, the "equation is missing", should read -- $V_{Ag} \simeq V°_{Ag} + \frac{RT}{F} \ln [Ag+]$ --

Signed and Sealed this

Thirteenth Day of June, 1995

Attest:

*Attesting Officer*

BRUCE LEHMAN

*Commissioner of Patents and Trademarks*